(12) United States Patent
Wahl

(10) Patent No.: US 12,690,711 B2
(45) Date of Patent: Jul. 28, 2026

(54) COFFEE FILTER

(71) Applicant: Pacific Market International, LLC, Seattle, WA (US)

(72) Inventor: Andrew C.F. Wahl, Seattle, WA (US)

(73) Assignee: Pacific Market International, LLC, Seattle, WA (US)

( * ) Notice: Subject to any disclaimer, the term of this patent is extended or adjusted under 35 U.S.C. 154(b) by 592 days.

(21) Appl. No.: 17/886,004

(22) Filed: Aug. 11, 2022

(65) Prior Publication Data

US 2023/0076101 A1 Mar. 9, 2023

Related U.S. Application Data

(63) Continuation of application No. 16/582,876, filed on Sep. 25, 2019, now abandoned, which is a (Continued)

(51) Int. Cl.
*A47J 31/06* (2006.01)

(52) U.S. Cl.
CPC ................................ *A47J 31/0626* (2013.01)

(58) Field of Classification Search
CPC ........ A47J 31/0626; A47J 31/00; A47J 31/02; A47J 31/06; A47J 31/061; A47J 31/0636
(Continued)

(56) References Cited

U.S. PATENT DOCUMENTS 2,464,722 A * 3/1949 Sacker .................. A47J 31/043
99/292
2,570,997 A * 10/1951 Willman .............. A47J 31/303
99/317
(Continued)

FOREIGN PATENT DOCUMENTS

CN 107224206 A 10/2017
DE 202016001903 U1 6/2016
(Continued)

OTHER PUBLICATIONS

Chinese Office Action for Application No. 202080002455.0, Sep. 29, 2024, 14 pages.
(Continued)

*Primary Examiner* — Hung D Nguyen
(74) *Attorney, Agent, or Firm* — Merchant and Gould, PC

(57) ABSTRACT

A filter assembly that includes a receptacle, filter, and filter holder. The receptacle has an inside surface defining an open-ended first through-channel. The filter is positioned inside the first through-channel and configured to produce a filtered liquid by filtering particulates each larger than a predetermined size from a liquid. The filtered liquid exits the filter through an outlet opening of the filter. The filter holder removably couples the filter to the receptacle. A holding area configured to receive the liquid is defined in the first through-channel above the filter holder and between the filter and the inside surface of the receptacle. The filter holder includes an open-ended second through-channel in fluid communication with the outlet opening and configured to receive the filtered liquid from the outlet opening. The second through-channel is configured to be in fluid communication with an interior of a container and to provide the filtered liquid thereto.

9 Claims, 7 Drawing Sheets

Related U.S. Application Data continuation-in-part of application No. 29/697,644, filed on Jul. 10, 2019, now Pat. No. Des. 948,934.

(58) Field of Classification Search
USPC .......................................................... 99/279
See application file for complete search history.

(56) References Cited

U.S. PATENT DOCUMENTS

| | | | | |
|---|---|---|---|---|
| 2,732,787 | A * | 1/1956 | Osborne ................. | A47J 31/02 99/295 |
| 2,983,217 | A * | 5/1961 | Gill ....................... | A47J 31/605 99/305 |
| 3,823,656 | A * | 7/1974 | Vander Veken ... | B65D 85/8043 426/77 |
| 4,167,136 | A * | 9/1979 | Chupurdy ............... | A47J 31/02 99/322 |
| 4,174,659 | A * | 11/1979 | Pugliese ................. | A47J 31/02 99/306 |
| 4,446,158 | A * | 5/1984 | English ................... | A47J 31/02 D7/400 |
| 4,908,222 | A * | 3/1990 | Yu .......................... | A47J 36/027 426/241 |
| 5,249,509 | A * | 10/1993 | English ............... | A47J 31/0621 99/305 |
| D381,866 | S * | 8/1997 | St-Gelais ........................ | D7/400 |
| 5,775,206 | A * | 7/1998 | St-Gelais ................ | A47J 31/02 99/295 |
| 5,826,493 | A * | 10/1998 | Tien Lin ............... | A47J 31/061 99/323 |
| D406,725 | S * | 3/1999 | Joergensen .................... | D7/400 |
| 5,902,620 | A * | 5/1999 | Nolan ................... | A47J 31/303 99/302 R |
| 6,068,707 | A * | 5/2000 | Magliocca .............. | B08B 3/006 134/201 |
| 6,263,780 | B1 * | 7/2001 | Rolfes ................... | A47J 31/446 99/279 |
| 6,339,985 | B1 * | 1/2002 | Whitney ............... | A47J 31/505 99/290 |
| 6,343,542 | B1 * | 2/2002 | Shen ....................... | A47J 31/02 99/317 |
| D513,152 | S * | 12/2005 | Cahen ............................ | D7/400 |
| D567,021 | S * | 4/2008 | Bach .............................. | D7/400 |
| 7,926,414 | B1 | 4/2011 | Wolcott et al. | |
| 9,167,933 | B2 | 10/2015 | Carr | |
| D778,668 | S * | 2/2017 | Hojo ............................... | D7/400 |
| D779,875 | S * | 2/2017 | Gross ............................. | D7/400 |
| D791,534 | S * | 7/2017 | Bueno ............................ | D7/400 |
| D796,889 | S * | 9/2017 | Laskowski ..................... | D7/321 |
| D797,503 | S * | 9/2017 | Robotti .......................... | D7/400 |
| D847,564 | S * | 5/2019 | Best ............................... | D7/400 |
| 10,314,320 | B2 * | 6/2019 | Roberts ................... | A23L 2/385 |
| D873,607 | S * | 1/2020 | Day, Jr. ......................... | D7/400 |
| D873,608 | S * | 1/2020 | de Martrin-Donos ......... | D7/400 |
| D873,628 | S * | 1/2020 | Chen .............................. | D7/673 |
| D884,420 | S * | 5/2020 | McLean ......................... | D7/400 |
| D948,934 | S | 4/2022 | Wahl | |
| 2001/0003951 | A1 * | 6/2001 | Joergensen ........... | A47J 31/446 99/323.1 |
| 2002/0014161 | A1 * | 2/2002 | Mork .................... | A47J 31/542 99/279 |
| 2003/0157226 | A1 * | 8/2003 | Leung ................. | A47J 31/0615 426/433 |
| 2003/0226449 | A1 * | 12/2003 | Carasso .............. | A47J 31/0663 99/279 |
| 2004/0094039 | A1 * | 5/2004 | Brizio ................... | A47J 31/303 99/279 |
| 2004/0182249 | A1 * | 9/2004 | Wilson ................. | A47J 31/446 99/279 |
| 2005/0076784 | A1 * | 4/2005 | Tebo, Jr. ............. | A47J 31/0647 99/279 |
| 2005/0132892 | A1 * | 6/2005 | Hall ...................... | A47J 31/047 99/279 |
| 2005/0160919 | A1 * | 7/2005 | Balkau .................. | A47J 31/369 99/279 |
| 2005/0199129 | A1 * | 9/2005 | Glucksman ............. | A47J 31/20 99/279 |
| 2006/0130666 | A1 * | 6/2006 | Bardazzi ............. | A47J 31/0668 99/279 |
| 2006/0150821 | A1 * | 7/2006 | Paul ...................... | A47J 31/401 99/279 |
| 2007/0137494 | A1 * | 6/2007 | Wilhite ................... | A47J 31/20 99/279 |
| 2007/0175335 | A1 * | 8/2007 | Liverani ............. | A47J 31/3695 99/279 |
| 2007/0186779 | A1 * | 8/2007 | Fung ..................... | A47G 19/16 99/275 |
| 2009/0178572 | A1 * | 7/2009 | Wolcott ............. | A47J 31/0626 99/323 |
| 2009/0199721 | A1 | 8/2009 | Hausslein | |
| 2010/0024659 | A1 * | 2/2010 | Liu ....................... | A47J 31/061 210/473 |
| 2010/0112164 | A1 * | 5/2010 | Taylor .................... | A47J 31/02 206/217 |
| 2010/0263548 | A1 * | 10/2010 | Kokatsu ................... | A47J 31/02 99/306 |
| 2011/0223302 | A1 * | 9/2011 | Star ........................... | A23L 2/39 99/279 |
| 2012/0067221 | A1 * | 3/2012 | Krul ...................... | A47J 31/061 99/289 R |
| 2013/0022717 | A1 * | 1/2013 | Meyl ..................... | A47J 31/547 99/279 |
| 2013/0061762 | A1 * | 3/2013 | Carr .................... | A47J 31/3695 99/295 |
| 2013/0186280 | A1 * | 7/2013 | Sekiguchi ............. | A47J 31/005 99/287 |
| 2014/0356502 | A1 * | 12/2014 | Goeltenboth ....... | A47J 31/3614 426/433 |
| 2015/0030738 | A1 * | 1/2015 | Meyl ................... | A47J 31/0684 426/431 |
| 2016/0120355 | A1 * | 5/2016 | Shen ................... | A47J 31/0626 99/322 |
| 2016/0135639 | A1 | 5/2016 | Sacks | |
| 2016/0311608 | A1 * | 10/2016 | Accursi ............... | A47J 31/3695 |
| 2016/0362246 | A1 * | 12/2016 | Garcin ................... | A23F 5/262 |
| 2018/0064283 | A1 * | 3/2018 | Hertaus ................... | A47J 31/20 |
| 2019/0191914 | A1 * | 6/2019 | Schillheim .......... | A47J 31/0626 |
| 2021/0007535 | A1 | 1/2021 | Wahl | |

FOREIGN PATENT DOCUMENTS

| | | |
|---|---|---|
| GB | 250072 A | 4/1926 |
| JP | 2010099174 A | 5/2010 |
| JP | 2010148704 A | 7/2010 |
| JP | 2013043031 A | 3/2013 |

OTHER PUBLICATIONS

European Extended Search Report in Application 20780081.4, mailed Dec. 15, 2021.

PCT International Preliminary Report on Patentability in Application PCT/US2020/041283, mailed Jan. 20, 2022.

PCT International Search Report and Written Opinion in Application PCT/US2020/041283, mailed Oct. 5, 2020.

U.S. Appl. No. 16/582,876 entitled Coffee Filter filed Sep. 25, 2019, 26 pages.

U.S. Appl. No. 29/697,644, Non-Final Office Action mailed Jun. 10, 2021.

U.S. Appl. No. 29/697,644, Restriction Requirement mailed Dec. 2, 2020.

Japanese Office Action for Application No. 2020-558459, Oct. 1, 2024, 4 pages.

* cited by examiner

COFFEE FILTER

CROSS REFERENCE TO RELATED APPLICATION(S)

This application is a continuation of and claims priority to U.S. application Ser. No. 16/582,876, filed on Sep. 25, 2019, which is a continuation-in-part of U.S. Design application Ser. No. 29/697,644, filed on Jul. 10, 2019, the entire disclosures of which are incorporated herein by reference in their entireties. To the extent appropriate, a claim of priority is made to each of the above disclosed applications.

BACKGROUND OF THE INVENTION

Field of the Invention

The present invention is directed generally to filtering devices for making beverages and more particularly to coffee filters.

Description of the Related Art

Many consumers enjoy drinking filtered beverages, such as coffee and tea. Therefore, needs exist for devices configured to filter such beverages.

BRIEF DESCRIPTION OF THE SEVERAL VIEWS OF THE DRAWING(S)

Like reference numerals have been used in the figures to identify like components.

DETAILED DESCRIPTION OF THE INVENTION

Figure 1:
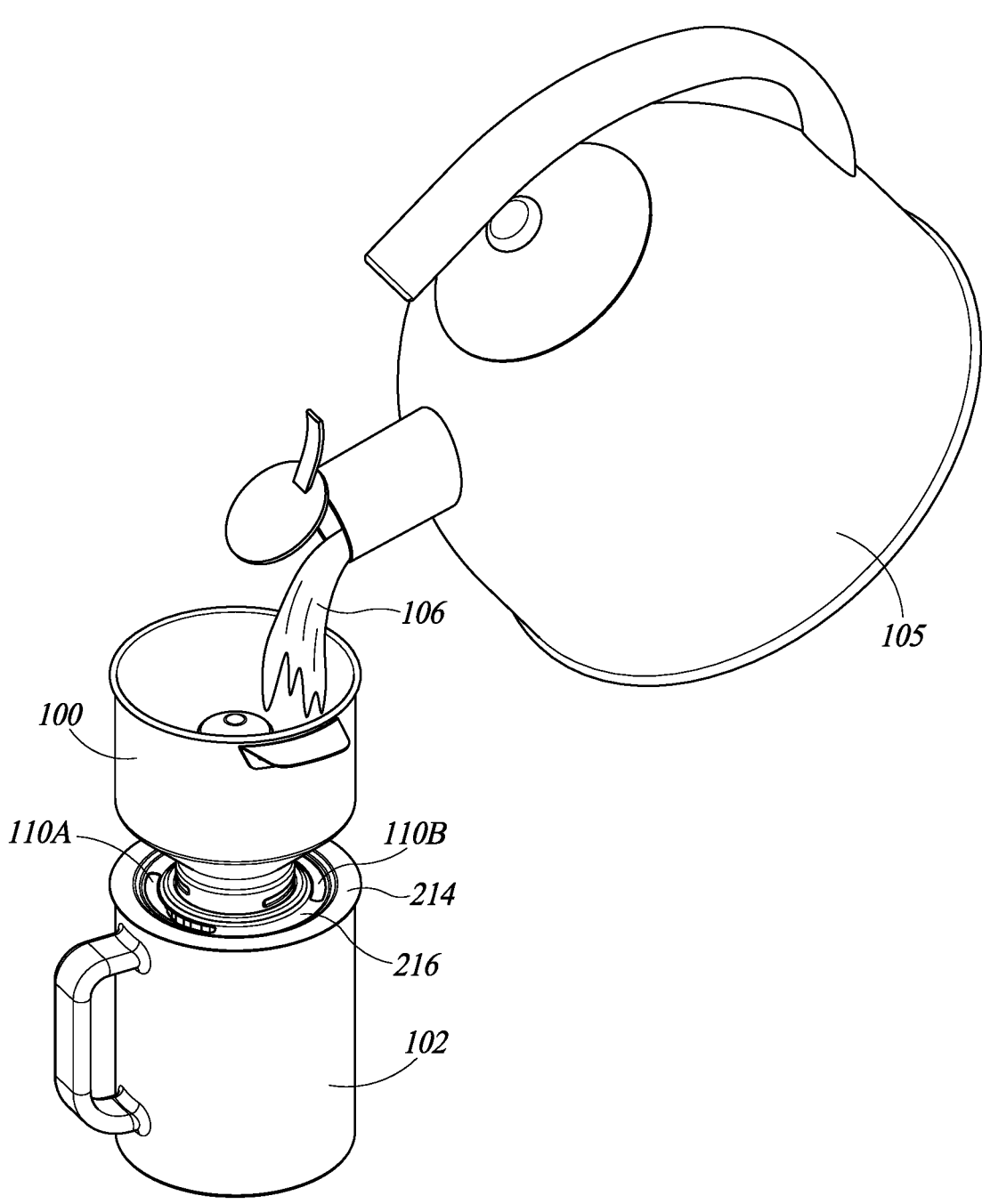
FIG. 1 is a perspective view of a liquid being poured into a filter assembly that is resting on a container as viewed from above.
Figure 7:
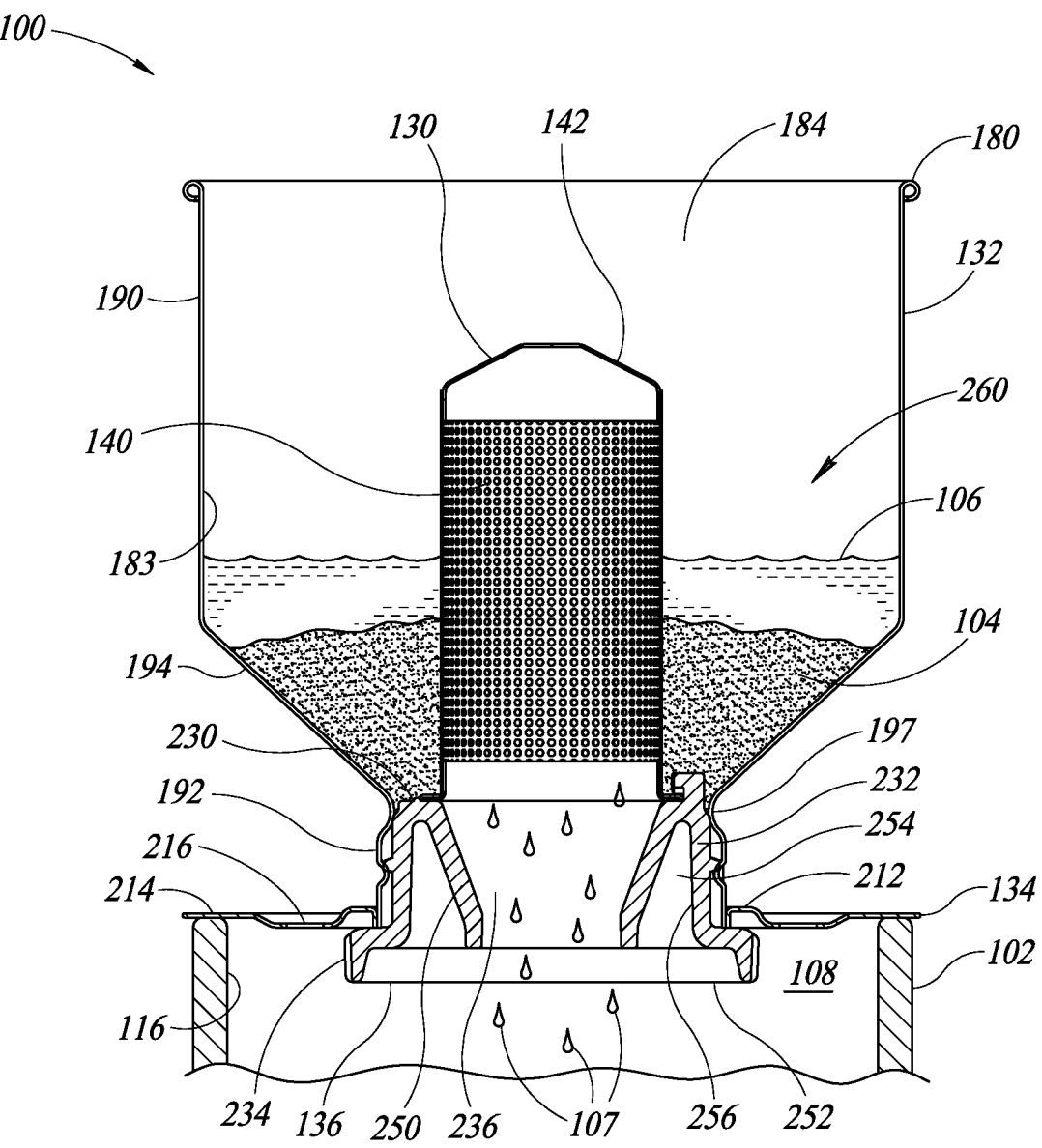
FIG. 7 is a side cross-sectional view of the filter assembly resting on the container taken through a line 7-7 of FIG. 6, the filter assembly being illustrated holding particulates, allowing the liquid to combine with the particulates to form a composition, and allowing a liquid portion of the composition to flow through the filter member to produce a filtered liquid.

FIG. 1 is a perspective view of a filter assembly 100 resting on a container 102 (e.g., a mug). The filter assembly 100 is configured to hold particles or particulates 104 (see FIG. 7), such as coffee grounds, tea, and the like. A tea kettle 105 is illustrated pouring liquid 106 (e.g., heated water) into the filter assembly 100 whereat the liquid 106 encounters the particulates 104 (see FIG. 7). Referring to FIG. 7, the filter assembly 100 filters the particulates 104 from the liquid 106 to produce a filtered liquid 107, such as coffee, tea, and the like. The filtered liquid 107 then flows into an interior 108 of the container 102. Returning to FIG. 1, the filter assembly 100 includes one or more apertures 110A and 110B through which a user may look to see a level of the filtered liquid 107 (see FIG. 7) inside the interior 108 (see FIGS. 2 and 7) of the container 102. The filter assembly 100 may be used as a pour-over coffee maker. Alternatively, the filter assembly 100 may be used with or integrated into a machine that automatically makes coffee. By way of yet another non-limiting example, the filter assembly 100 may be implemented as a single service coffee filter.

Figure 2:
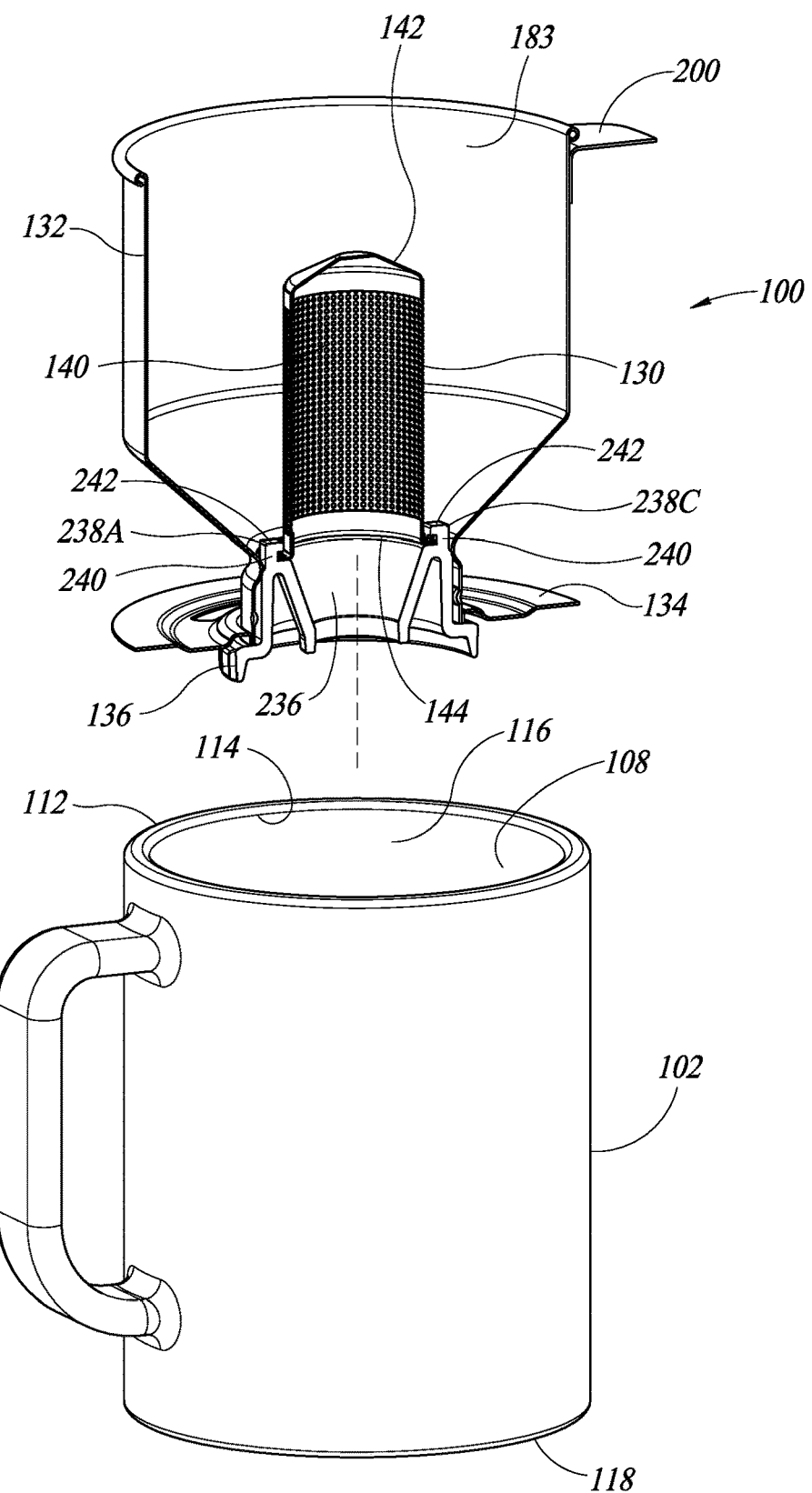
FIG. 2 is a side perspective view of a vertical cross-section of the filter assembly of FIG. 1 illustrated above the container of FIG. 1.

Referring to FIG. 2, the container 102 includes a rim 112 that defines an upper opening 114 into the interior 108. The container 102 has an inside surface 116 that surrounds and defines the interior 108. The rim 112 is opposite a closed bottom portion 118. While the container 102 has been illustrated as being a mug, the filter assembly 100 may be used with any container that includes an interior like the interior 108 and a rim like the rim 112. By way of non-limiting examples, the container 102 may be a bowl, a coffee pot, a carafe, a cup, a mug, a cooking pot, and the like.

Figure 3:
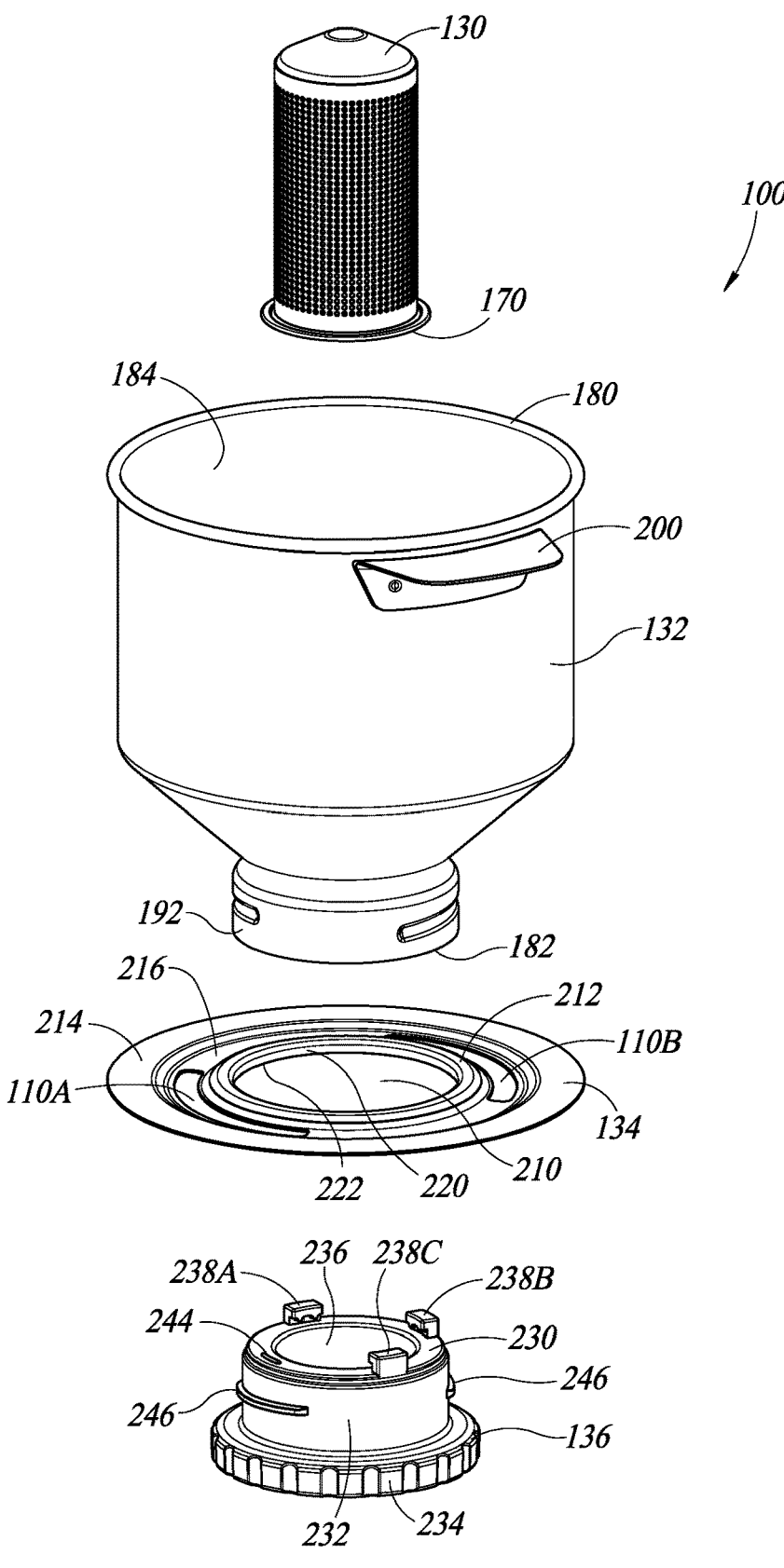
FIG. 3 is a partially exploded perspective view of the filter assembly of FIG. 1.

FIG. 3 is a partially exploded perspective view of the filter assembly 100. As shown in FIG. 3, the filter assembly 100 includes a filter member 130, a receptacle 132, a flange 134, and a filter holder member 136.

Figure 4:
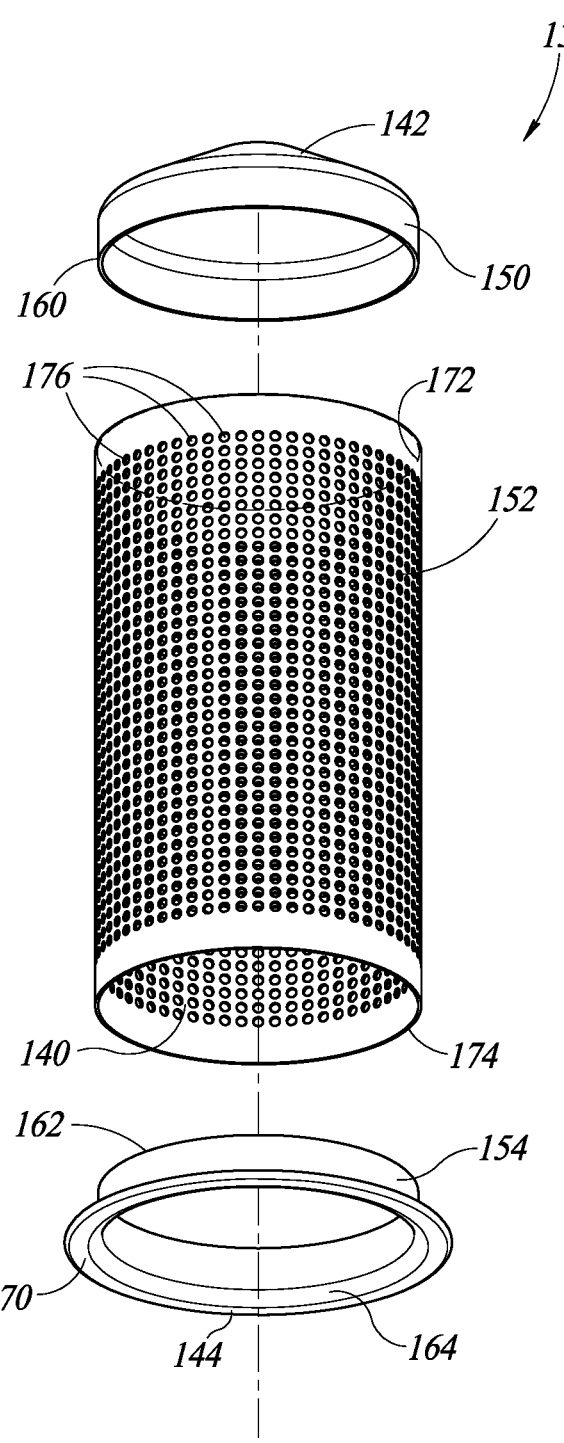
FIG. 4 is an exploded perspective view of a filter member of the filter assembly of FIG. 1.

Referring to FIG. 2, the filter member 130 has a hollow interior 140 and may be generally cylindrically shaped. The filter member 130 has a closed upper end 142 opposite an open lower end 144. In the embodiment illustrated in FIG. 4, the filter member 130 includes a top cap 150, a sidewall 152, and a lower anchor portion 154. The closed upper end 142 is formed in the top cap 150. The top cap 150 has an open lower portion 160.

The lower anchor portion 154 has an open upper portion 162. The open lower end 144 is formed in the lower anchor portion 154 and includes an outlet opening 164. The outlet opening 164 opens into the hollow interior 140 inside the filter member 130. The lower anchor portion 154 includes an outwardly extending flange 170 that extends circumferentially around the outlet opening 164 and extends outwardly away from the outlet opening 164. The flange 170 may be substantially perpendicular to the open upper portion 162.

The sidewall 152 may be generally cylindrically shaped and may extend between the top cap 150 and the lower anchor portion 154. The hollow interior 140 is defined at least partially by the sidewall 152. In the embodiment illustrated, a majority portion of the hollow interior 140 is defined by the sidewall 152. The sidewall 152 has an upper opening 172 opposite a lower opening 174. The open lower portion 160 of the top cap 150 is configured to be received inside the upper opening 172 of the sidewall 152 and the open upper portion 162 of the lower anchor portion 154 is configured to be received inside the lower opening 174 of the sidewall 152.

The sidewall 152 includes perforations or through-holes 176 in fluid communication with the hollow interior 140. The through-holes 176 are configured to allow the liquid 106 (see FIGS. 1 and 7) to pass therethrough but to prevent those of the particulates 104 (see FIG. 7) that are larger than a predetermined size from passing through the through-holes 176. By way of a non-limiting example, the predetermined size may be smaller than (e.g., 10% to 50% of) a grind size (e.g., 0.75 millimeters to 1 millimeter) of ground coffee of the type typically used to make coffee. Optionally, different filter members, each like the filter member 130 but having differently sized through-holes (like the through-holes 176) may be used with different particulates (e.g., ground coffee having different grind sizes). For example, a user may simply select the filter member having through-holes configured for use with particular particulates (e.g., ground coffee) the user wishes to use and install the selected filter member in the receptacle 132. The filter member 130 may be implemented as a screen filter. In such embodiments, the sidewall 152 may be constructed from a screen or screen-like structure. The filter member 130 may be constructed from metal, plastic, and the like.

Figure 5:
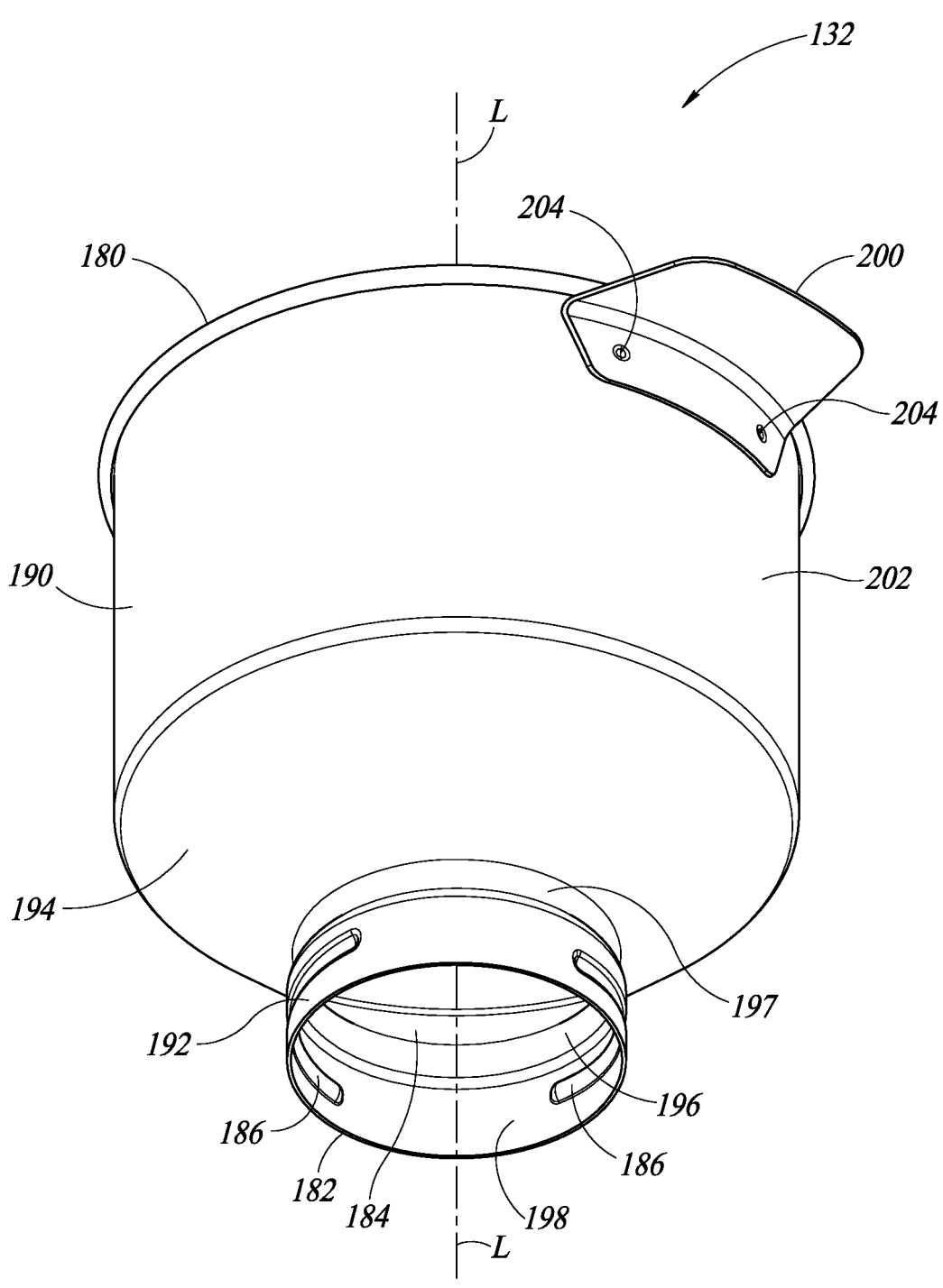
FIG. 5 is a bottom perspective view of a receptacle of the filter assembly of FIG. 1.

Referring to FIG. 5, the receptacle 132 may be generally cone or funnel shaped but this is not a requirement. The receptacle 132 extends along a longitudinal axis "L" and has an open upper end 180 opposite an open lower end 182. The receptacle 132 has an inside surface 183 (see FIG. 2) that defines an open ended through-channel 184 that extends along the longitudinal axis "L" from the open upper end 180 to the open lower end 182. Referring to FIG. 2, the open lower end 182 (see FIGS. 3 and 5) is positionable within the upper opening 114 defined by the rim 112 of the container 102. Returning to FIG. 5, the receptacle 132 has inside threads 186 positioned at or near the open lower end 182.

In the embodiment illustrated, the receptacle 132 has an upper cylindrically shaped portion 190 and a lower cylindrically shaped portion 192. The open upper end 180 is formed in the upper cylindrically shaped portion 190 and the open lower end 182 is formed in the lower cylindrically shaped portion 192. The upper and lower cylindrically shaped portions 190 and 192 are connected to one another by a tapered portion 194. The upper cylindrically shaped portion 190 has a larger inside diameter than the lower cylindrically shaped portion 192. In the embodiment illustrated, the lower cylindrically shaped portion 192 has a reduced diameter portion 196. The reduced diameter portion 196 may be formed by crimping a crimped portion 197 of the lower cylindrically shaped portion 192 inwardly until the crimped portion 197, extends into the through-channel 184 as the reduced diameter portion 196. The inside threads 186 are formed in the lower cylindrically shaped portion 192 below the reduced diameter portion 196. The lower cylindrically shaped portion 192 includes a lower portion 198 of the inside surface 183 (see FIG. 2). The receptacle 132 may be constructed from metal, plastic, and the like.

The receptacle 132 may include a handle 200 that extends laterally and outwardly from an outside surface 202 of the receptacle 132. In the embodiment illustrated, the handle 200 is positioned near the open upper end 180 but this is not a requirement. The handle 200 may be affixed to the receptacle 132 by fasteners 204 (e.g., rivets, bolts, screws, and the like). The handle 200 may be constructed from metal, plastic, and the like.

Referring to FIG. 3, the flange 134 is positioned near the open lower end 182 of the receptacle 132 and may be at least partially held in place by the filter holder member 136. In the embodiment illustrated, the flange 134 has a through-hole 210 configured to receive the lower cylindrically shaped portion 192 of the receptacle 132. The flange 134 may be generally round or disk-shaped and the through-hole 210 may be positioned in a central portion 212 of the flange 134.

Referring to FIG. 7, the flange 134 has an outer portion 214 configured to rest upon the rim 112 (see FIG. 2) of the container 102. In other words, the flange 134 is configured to support the filter assembly 100 on the container 102 and is configured to bear the weight of the filter assembly 100, the particulates 104, and the liquid 106. The outer portion 214 may be substantially planar.

The flange 134 has an offset portion 216 positioned between the outer portion 214 and the central portion 212. In the embodiment illustrated, the offset portion 216, the outer portion 214, and the central portion 212 are each generally ring-shaped and concentric with one another. Referring to FIG. 1, the apertures 110A and 110B (e.g., slots) are formed in the offset portion 216 and provide visibility into the container 102 when the outer portion 214 is resting atop the rim 112 (see FIG. 2) of the container 102 so the user can see into the container 102 and view the level of the filtered liquid 107 (see FIG. 7) inside the interior 108 (see FIGS. 2 and 7) of the container 102. Referring to FIG. 3, in the embodiment illustrated, the apertures 110A and 110B are curved along a circular path that is concentric with the offset portion 216, the outer portion 214, and the central portion 212. Referring to FIG. 7, the offset portion 216 may be offset vertically with respect to the outer portion 214 such that the offset portion 216 extends downwardly further than the outer portion 214. Thus, if the filter assembly 100 slides along the rim 112 (see FIG. 2) laterally with respect to the longitudinal axis "L" (see FIG. 5), the offset portion 216 will contact the inside surface 116 of the container 102 near the rim 112 and limit the sliding of the filter assembly 100. In this manner, the offset portion 216 may help keep the flange 134 from sliding off the rim 112 (see FIG. 2) when the filter assembly 100 is inadvertently bumped or pushed laterally with respect to the longitudinal axis "L" (see FIG. 5).

The central portion 212 may be offset vertically with respect to the outer portion 214 such that the central portion 212 extends upwardly further than the outer portion 214. Referring to FIG. 3, the central portion 212 terminates along the through-hole 210 and includes a sidewall portion 220 configured to fit snuggly along the lower cylindrically shaped portion 192. Friction between the sidewall portion 220 and the lower cylindrically shaped portion 192 helps prevent the flange 134 from sliding upwardly along the lower cylindrically shaped portion 192. Optionally, the sidewall portion 220 may be permanently affixed (e.g., welded) to the lower cylindrically shaped portion 192. The sidewall portion 220 has a lower free edge 222.

The filter holder member 136 has an upper portion 230, an intermediate portion 232, and a lower grip portion 234. An open ended through-channel 236 extends from the upper portion 230 to the lower grip portion 234 through the intermediate portion 232.

Figure 6:
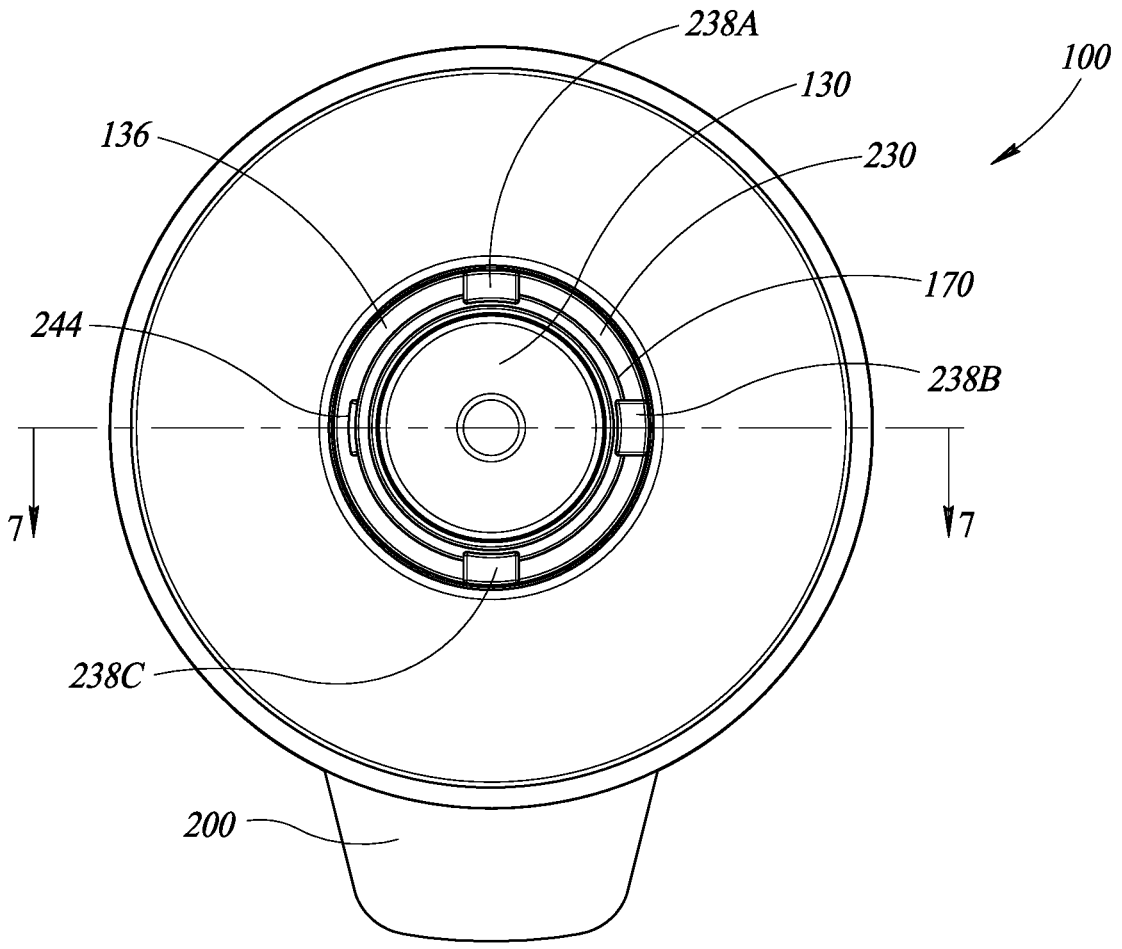
FIG. 6 is a top view of the filter assembly of FIG. 1 resting on the container of FIG. 1.

The upper portion 230 is configured to receive and support the filter member 130. The filter holder member 136 includes L-shaped bracket members or tabs 238A-238C that extend upwardly from the upper portion 230. Referring to FIG. 2, each of the tabs 238A-238C has an upright support leg 240 and an upper leg 242 that is substantially orthogonal to the upright support leg 240. The upper leg 242 extends from the upright support leg 240 toward the through-channel 236. As shown in FIG. 6, the tabs 238A-238C are configured to receive the flange 170 of the filter member 130 below the upper legs 242 (see FIG. 2). In this manner, the tabs 238A-238C trap the flange 170 between the upper legs 242 (see FIG. 2) and the upper portion 230, which prevents the filter member 130 from being lifted upwardly. Thus, the filter holder member 136 may be described as forming a bayonet style connection or bayonet mount with the filter member 130. The upper portion 230 may include a bump or stop 244 configured to help keep the flange 170 engaged with the tabs 238A-238C. In other words, the stop 244 helps prevent the filter member 130 from being slid laterally away from the tabs 238A-238C. Thus, to slide the flange 170 into engagement with the tabs 238A-238C, the flange 170 must be pushed laterally with sufficient force to push the flange 170 over the stop 244 and under the upper legs 242 (see FIG. 2). Similarly, to slide the flange 170 out of engagement with the tabs 238A-238C, the flange 170 must be pulled laterally with sufficient force to pull the flange 170 over the stop 244 and out from under the upper legs 242 (see FIG. 2). Referring to FIG. 2, the tabs 238A-238C and the stop 244 (see FIGS. 3 and 6) position the filter member 130 such that any liquid flowing through the outlet opening 164 (see FIG. 4) of the filter member 130 enters the through-channel 236 and is conducted thereby into the interior 108 (see FIGS. 2 and 7) of the container 102 (see FIGS. 1, 2, and 7). Thus, the through-channel 236 is in fluid communication with the outlet opening 164 (see FIG. 4) and receives the filtered liquid 107 (see FIG. 7) from the outlet opening 164. The through-channel 236 is also in fluid communication with the interior 108 (see FIGS. 2 and 7) of the container 102 (see FIGS. 1, 2, and 7) and provides the filtered liquid 107 to the interior 108 of the container 102.

Referring to FIG. 3, the intermediate portion 232 includes outside threads 246 configured to mate with the inside threads 186 (see FIG. 5) of the receptacle 132. Thus, the filter holder member 136 may be joined with the receptacle 132 and couple the filter member 130 inside the through-channel 184 of the receptacle 132. The filter member 130 extends upwardly from the upper portion 230 of the filter holder member 136 along the longitudinal axis "L" (see FIG. 5).

The lower grip portion 234 is configured to be gripped by a user and used to turn the filter holder member 136 relative to the receptacle 132 in a first direction (e.g., clockwise) to selectively thread the inside and outside threads 186 (see FIG. 5) and 246 together to thereby removably connect the filter holder member 136 to the receptacle 132. The lower grip portion 234 is also configured to be gripped by the user and used to turn the filter holder member 136 relative to the receptacle 132 in a second direction (e.g., counter-clockwise) to selectively unthread the outside threads 246 from the inside threads 186 (see FIG. 5) to thereby separate the filter holder member 136 from the receptacle 132. The first and second directions are opposite one another. In the embodiment illustrated, the lower grip portion 234 extends radially outwardly beyond the intermediate portion 232. In such embodiments, the lower free edge 222 of the sidewall portion 220 of the flange 134 may be positioned near or rest upon the lower grip portion 234 when the filter holder member 136 is threaded into the receptacle 132. Referring to FIG. 7, the through-channel 236 extends through the lower grip portion 234. The lower grip portion 234 may be at least partially positioned inside the interior 108 of the container 102.

When the filter holder member 136 is threaded into the receptacle 132, the upper portion 230 of the filter holder member 136 is positioned at or near the location where the tapered portion 194 is connected to the lower cylindrically shaped portion 192. Thus, the filter member 130 extends upwardly into the upper cylindrically shaped portion 190 from at or near the bottom of the tapered portion 194. This positions the filter member 130 above the rim 112 (see FIG. 2) of the container 102. In the embodiment illustrated, the upper portion 230 is positioned alongside the crimped portion 197 and the reduced diameter portion 196 (see FIG. 5).

The upper portion 230 is configured to prevent the particulates 104 (e.g., the coffee grounds, tea, and the like) from exiting the through-channel 184 through the open lower end 182 (see FIGS. 3 and 5) except through the filter member 130. In other words, the only paths out of the receptacle 132 for the particulates 104 (e.g., the coffee grounds) are through the open upper end 180 and through the filter member 130.

But, as mentioned above, only those of the particulates 104 having sizes smaller than the predetermined size may pass through the filter member 130.

Additionally, the filter holder member 136 may form a liquid tight seal with the lower portion 198 (see FIG. 5) of the inside surface 183. In such embodiments, the only path from the receptacle 132 to the interior 108 of the container 102 for the liquid 106 is through the through-holes 176 (see FIG. 4) of the filter member 130. By way of a non-limiting example, the filter holder member 136 may form a liquid tight seal with the reduced diameter portion 196 (see FIG. 5) of the receptacle 132. In the embodiment illustrated, the filter member 130 does not extend to the open upper end 180 and the closed upper end 142 is positioned inside the through-channel 184 below the open upper end 180.

The through-channel 236 may be defined by an internal tapered sidewall 250 that extends downwardly from the upper portion 230 through the intermediate portion 232, and terminates at or near the lower grip portion 234. In the embodiment illustrated, the lower grip portion 234 has a lower open end 252 in communication with an internal cavity 254 defined between the internal tapered sidewall 250 and an internal surface 256 of the intermediate portion 232. The filter holder member 136 may be constructed from metal, plastic, and the like.

Referring to FIG. 7, to use the filter assembly 100, the particulates 104 (e.g., the coffee grounds) may be poured into the through-channel 184 through the open upper end 180 of the receptacle 132. The particulates 104 will rest or accumulate in a space or holding area defined above the upper portion 230 and between the filter member 130 and the inside surface 183 of the receptacle 132. Then, the liquid 106 is poured into the through-channel 184 through the open upper end 180 of the receptacle 132. The liquid 106 and the particulates 104 (e.g., the coffee grounds) combine in the holding area to form a composition 260. As explained above, the filter member 130 projects upward at the center of the receptacle 132 along the longitudinal axis "L" (see FIG. 5). The filter member 130 filters the composition 260 to produce the filtered liquid 107 (e.g., coffee or tea). In other words, at least a liquid portion of the composition 260 travels through the through-holes 176 (see FIG. 4) formed in the filter member 130 and enters the hollow interior 140 as the filtered liquid 107. The filtered liquid 107 includes a majority of the liquid 106 and those of the particulates 104 (e.g., the coffee grounds) that have a size that is smaller than the predetermined size. The filtered liquid 107 travels downward through the hollow interior 140, exits the outlet opening 164 (see FIG. 4), and enters the through-channel 236. The filtered liquid 107 then travels downward through the through-channel 236, exits the lower open end 252 of the lower grip portion 234, and enters the interior 108 of the container 102.

To clean the filter assembly 100, it is turned upside down and the particulates 104 (e.g., the coffee grounds) are dumped out through the open upper end 180. Next, the filter assembly 100 is at least partially disassembled. Referring to FIG. 3, this may begin by unthreading the filter holder member 136 from the receptacle 132. Then, referring to FIG. 6, the filter member 130 may be removed from the filter holder member 136 by disengaging the flange 170 from the tabs 238A-238C, which disassembles the bayonet mount. Referring to FIG. 7, the filter member 130 may be cleaned (e.g., rinsed) after it is removed from the filter holder member 136. Optionally, the flange 134 may be removed from the receptacle 132 and cleaned, if the flange 134 is not permanently attached to the receptacle 132. Further, the receptacle 132 and/or the filter holder member 136 may be cleaned, if desired. After the filter member 130 has been cleaned, the filter assembly 100 may be reassembly.

Referring to FIG. 6, the filter assembly 100 may be reassembled by pushing the flange 170 into engagement with the tabs 238A-238C, which reassembles the bayonet mount and attaches the filter member 130 to the filter holder member 136. Then, referring to FIG. 7, if the flange 134 was removed from the receptacle 132, the lower cylindrically shaped portion 192 is inserted into the through-hole 210 to thereby reconnect the flange 134 to the receptacle 132. Next, the outside threads 246 of the filter holder member 136 are threaded to the inside threads 186 (see FIG. 5) of the receptacle 132 to position the filter member 130 to project upwardly at the center of the receptacle 132 along the longitudinal axis "L" (see FIG. 5). At this point, the filter assembly 100 is ready for use.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B, and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context.

Accordingly, the invention is not limited except as by the appended claims.

The invention claimed is:

1. A beverage filtration apparatus comprising:

a receptacle at least partially defining a through-channel, wherein the through-channel comprises an upper opening, the upper opening being configured to receive a liquid and beverage particulates, and wherein the receptacle comprises a lower portion, an upper portion, and a middle tapered portion therebetween;

a filter member positioned inside the through-channel, the filter member including a plurality of through-holes in a vertical sidewall of the filter member, the plurality of through-holes being configured to allow the liquid to pass therethrough and configured to prevent the beverage particulates from passing therethrough;

a filter holder member configured to receive the liquid passing through the filter member, wherein an upper portion of the filter holder member is removably coupled to the filter member at least partially inside the tapered portion of the receptacle, wherein an intermediate portion of the filter holder member is removably coupled to the lower portion of the receptacle, wherein the intermediate portion of the filter holder member comprises outside threads and the lower portion of the receptacle comprises inside threads, and wherein the outside threads are configured to engage the inside threads to removably couple the filter holder member to the lower portion of the receptacle, and wherein a holding area is defined in the through-channel above the filter holder member and between an outer vertical surface of the filter member and an interior surface of the receptacle, the holding area being configured to hold at least the beverage particulates; and an internal tapered sidewall of the filter holder member, the internal tapered sidewall extending from the upper portion of the filter holder member through the intermediate portion of the filter holder member, the internal tapered sidewall defining a through-passage configured such that filtered liquid passes through the through-passage.

2. The beverage filtration apparatus of claim 1, further comprising:

an open lower end of the filter member, the open lower end positioned at least partially inside a tapered portion of the receptacle; and a closed upper end of the filter member opposite the open lower end, the closed upper end positioned at least partially inside the upper portion of the receptacle, wherein the filter member extends from the open lower end to the closed upper end.

3. The beverage filtration apparatus of claim 2, wherein the filter member has a hollow interior defined by the vertical sidewall, the closed upper end, and the open lower end.

4. The beverage filtration apparatus of claim 1, wherein the filter member is cylindrically shaped.

5. The beverage filtration apparatus of claim 1, further comprising:

a lower end of the filter member; and one or more bracket members of the filter holder member, wherein each of the one or more bracket members are removably connected to the lower end of the filter member, thereby forming a liquid seal between the filter member and the filter holder member.

6. The beverage filtration apparatus of claim 1, wherein an outer surface of the filter holder member forms a seal with an inner surface of the lower portion of the receptacle when the filter holder member is removably coupled to the lower portion of the receptacle.

7. The beverage filtration apparatus of claim 1, further comprising a flange having a central sidewall portion disposed about the lower portion of the receptacle, the flange being supported by the filter holder member, wherein at least a portion of a bottom surface of the flange is configured to sit on a container.

8. The beverage filtration apparatus of claim 7, wherein the flange is configured to support the weight of at least the receptacle, the filter holder member, and the filter member.

9. An apparatus comprising:

a receptacle at least partially defining a through-channel, wherein the receptacle comprises a lower portion, an upper portion, and a middle tapered portion therebetween;

a filter member positioned inside the through-channel, the filter member including a plurality of through-holes in a vertical sidewall of the filter member;

a filter holder member, wherein an upper portion of the filter holder member is removably coupled to the filter member at least partially inside the tapered portion of the receptacle, wherein an intermediate portion of the filter holder member is removably coupled to the lower portion of the receptacle, wherein the intermediate portion of the filter holder member comprises outside threads and the lower portion of the receptacle comprises inside threads, and wherein the outside threads are configured to engage the inside threads to removably couple the filter holder member to the lower portion of the receptacle, and wherein a holding area is defined in the through-channel above the filter holder member and between an outer surface of the vertical sidewall of the filter member and an interior surface of the receptacle; and an internal tapered sidewall of the filter holder member, the internal tapered sidewall extending from the upper portion of the filter holder member through the intermediate portion of the filter holder member, the internal tapered sidewall defining a through-passage configured such that filtered liquid passes through the through-passage.

* * * * *